(12) United States Patent
Sakai et al.

(10) Patent No.: US 10,148,942 B2
(45) Date of Patent: Dec. 4, 2018

(54) MIRROR DISPLAY SYSTEM

(71) Applicant: Sharp Kabushiki Kaisha, Sakai, Osaka (JP)

(72) Inventors: Akira Sakai, Sakai (JP); Masahiro Hasegawa, Sakai (JP); Hiroyuki Hakoi, Sakai (JP); Kiyoshi Minoura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/314,543

(22) PCT Filed: Jun. 3, 2015

(86) PCT No.: PCT/JP2015/066025
§ 371 (c)(1),
(2) Date: Nov. 29, 2016

(87) PCT Pub. No.: WO2015/186735
PCT Pub. Date: Dec. 10, 2015

(65) Prior Publication Data
US 2017/0188020 A1 Jun. 29, 2017

(30) Foreign Application Priority Data

Jun. 5, 2014 (JP) ................... 2014-116892

(51) Int. Cl.
*G02F 1/13* (2006.01)
*G02B 27/22* (2018.01)
*G02F 1/1335* (2006.01)
*H04N 13/128* (2018.01)
*H04N 13/302* (2018.01)
*H04N 13/346* (2018.01)
*H04N 13/366* (2018.01)

(52) U.S. Cl.
CPC ......... *H04N 13/346* (2018.05); *G02B 27/225* (2013.01); *G02F 1/13* (2013.01);
(Continued)

(58) Field of Classification Search
CPC ........ G02B 7/182; G02B 27/225; G02B 5/32; G02B 27/2292; H04N 13/0443;
(Continued)

(56) References Cited

U.S. PATENT DOCUMENTS 5,982,343 A * 11/1999 Iba ..................... G02B 27/0172
345/8
2004/0051827 A1 3/2004 Hinata et al.
2005/0156813 A1* 7/2005 Adachi .............. G02B 27/2278
345/1.3
(Continued)

FOREIGN PATENT DOCUMENTS

JP 11-015392 A 1/1999
JP 2003-241175 A 8/2003
(Continued)

OTHER PUBLICATIONS

Official Communication issued in International Patent Application No. PCT/JP2015/066025, dated Aug. 18, 2015.

*Primary Examiner* — Jade R Chwasz
(74) *Attorney, Agent, or Firm* — Keating & Bennett, LLP

(57) ABSTRACT

A mirror display system that enables simultaneous perception of a mirror image and a video image with suppressed uncomfortable feeling includes a half mirror plate including a half mirror layer; a 3D display device; and a control unit being configured to supply a video signal to the 3D display device. The 3D display device is disposed on the back surface side of the half mirror plate and is configured to display, by the video signal, a video image for the left eye and a video image for the right eye that give a parallax on a display surface of the 3D display device. The parallax is set such that a fused video image of the video image for the left eye and the video image for the right eye is perceived on the back surface side behind the display surface of the 3D display device.

9 Claims, 9 Drawing Sheets

(52) U.S. Cl.
CPC ......... *G02F 1/1335* (2013.01); *H04N 13/128* (2018.05); *H04N 13/302* (2018.05); *H04N 13/366* (2018.05)

(58) Field of Classification Search
CPC ........... H04N 13/0468; H04N 13/0402; H04N 13/0497; H04N 13/0459; H04N 13/0018; H04N 13/0415; H04N 9/3179; H04N 13/0007; H04N 21/816; H04N 2213/006; H04N 13/346; H04N 13/128; H04N 13/366; H04N 13/302; G02F 1/13; G02F 1/1335
USPC ... 359/839, 871, 466, 467, 475, 477, 22, 23, 359/25, 26
See application file for complete search history.

(56) References Cited

U.S. PATENT DOCUMENTS

2006/0159958 A1    7/2006  Lee
2011/0063421 A1*  3/2011  Kubota .............. H04N 13/0003
                                                        348/52

FOREIGN PATENT DOCUMENTS

| | | |
|---|---|---|
| JP | 2004-085590 A | 3/2004 |
| JP | 2004-125885 A | 4/2004 |
| JP | 2005-195824 A | 7/2005 |
| JP | 2006-201782 A | 8/2006 |
| JP | 2007-065314 A | 3/2007 |
| WO | 2014/103088 A1 | 7/2014 |

* cited by examiner

MIRROR DISPLAY SYSTEM

TECHNICAL FIELD

The present invention relates to a mirror display system. The present invention more specifically relates to a mirror display system using a mirror display that functions both as a mirror and as a display providing video images.

BACKGROUND ART

Recently, mirror displays have been proposed for applications such as digital signage (e.g. Patent Literatures 1 to 4). A mirror display includes a half mirror plate provided on the front surface of a display device so that the display device can function as a mirror. The mirror display provides video images owing to display light emitted from the display device and is also usable as a mirror by reflecting external light.

Known examples of an optical member with reflecting function include vapor-deposited metal films, dielectric multilayers, multilayer reflective polarizers, nano-wire grid polarizers (e.g. Patent Literatures 5 and 6), circularly-polarized light separating sheets utilizing selective reflection of cholesteric liquid crystals (e.g. Patent Literature 7).

CITATION LIST

Patent Literature

Patent Literature 1: JP 2004-125885 A
Patent Literature 2: JP 2003-241175 A
Patent Literature 3: JP H11-15392 A
Patent Literature 4: JP 2004-085590 A
Patent Literature 5: JP 2006-201782 A
Patent Literature 6: JP 2005-195824 A
Patent Literature 7: JP 2007-65314 A

SUMMARY OF INVENTION

Technical Problem

Unfortunately, in conventional mirror displays, a mirror image reflected by the mirror (hereinafter, also simply referred to as a mirror image) may fail to match a video image displayed by the display device (hereinafter, also simply referred to as a video image), which causes uncomfortable feeling. The reasons for this have been investigated by the inventors and are as follows.

FIG. 12 is a schematic view showing a relation between a mirror image and a video image in a conventional mirror display. The following describes the case of virtual fitting of a pair of glasses using a liquid crystal display device that provides two-dimensional (2D) video images (hereinafter, also referred to as a 2D liquid crystal display device) as a display device.

As shown in FIG. 12, a mirror display 102 includes, in the order from the back surface side to the viewer side, a 2D liquid crystal display device 111 and a half mirror plate 104. Here, when a viewer 108 standing at a position 1 m apart from the half mirror plate 104 sees the reflection of his/her own face in the mirror display 102, a mirror image M of his/her face is perceived at a position 2 m apart from the viewer 108. In other words, the mirror image M reflected by the half mirror plate 104 is perceived behind (on the back surface side of) the half mirror plate 104, not on the display surface of the half mirror plate 104. According to the optical theory, the mirror image M is shown in the mirror such that the mirror image M and the viewer 108 are symmetrical with respect to the display surface of the half mirror plate 104.

Meanwhile, when a video image D of a pair of glasses is displayed on the 2D liquid crystal display device 111 so as to place the virtual image of the glasses over the mirror image M, the video image D of the glasses is perceived at a position 1 m apart from the viewer 108 (the thickness of the half mirror plate is ignored since it is relatively small). As a result, the mirror image M of the face of the viewer 108 and the video image D of the glasses are perceived at positions with different depths. Thereby, the viewer 108 fails to simultaneously perceive his/her own face (the mirror image M) and the glasses (the video image D) and thus feels an obvious uncomfortableness. This is because the focal point and convergence angle for viewing the mirror image M are significantly different from those for viewing the video image D. Here, a convergence angle $\alpha$ refers to a convergence angle for viewing the mirror image M with pupils (eyes) E1 and E2 of the viewer 108, and a convergence angle $\beta$ refers to a convergence angle for viewing the video image D with the pupils E1 and E2 of the viewer 108. The convergence angle $\alpha$ differs from the convergence angle $\beta$.

In order to solve the problem of such uncomfortable feeling, the inventors studied a method in which the viewer 108 stands very close to the mirror display 102 so that the mirror image M and the video image D are perceived at the positions with the same depth. However, this method was found difficult for practical use in the case of virtual fitting of glasses or clothes, for example, because viewers would not stand as close as about several tens of millimeters from the mirror display.

As mentioned above, the uncomfortable feeling caused by the mirror image and the video image has not been fully considered, and thus the solution for this problem has not been found. For example, Patent Literatures 1 to 4 include no disclosure focusing on such uncomfortable feeling and thus fail to solve the above problem.

The present invention was made under the current situation in the art and aims to provide a mirror display system that enables simultaneous perception of the mirror image and the video image with suppressed uncomfortable feeling.

Solution to Problem

The inventors made intensive studies about a mirror display system that enables simultaneous perception of the mirror image and the video image with suppressed uncomfortable feeling, and focused on a configuration that uses binocular parallax (hereinafter, also simply referred to as parallax) as in a display device capable of displaying three-dimensional (3D) video images (hereinafter, also referred to as a 3D display device). Use of such a configuration enables the video image to be perceived on the back surface side behind the display surface of the 3D display device. The inventors devised a mirror display system including a half mirror plate, a 3D display device, and a control unit. The 3D display device is configured to display, by a video signal supplied from the control unit, a pair of video images (a video image for the left eye and a video image for the right eye) that give a parallax. The inventors found that this mirror display system can bring the mirror image and video image (a fused video image of the video image for the left eye and the video image for the right eye) close to positions with the same depth. Thus, the inventors reached the solution of the above problems and thereby arrived at the present invention.

Specifically, an aspect of the present invention may be a mirror display system including a half mirror plate including a half mirror layer; a 3D display device; and a control unit being configured to supply a video signal to the 3D display device, the 3D display device being disposed on the back surface side of the half mirror plate and being configured to display, by the video signal, a video image for the left eye and a video image for the right eye that give a parallax on a display surface of the 3D display device, the parallax being set such that a fused video image of the video image for the left eye and the video image for the right eye is perceived on the back surface side behind the display surface of the 3D display device.

Advantageous Effects of Invention

The present invention enables simultaneous perception of a mirror image and a video image with suppressed uncomfortable feeling. Moreover, when the present invention is applied to virtual fitting of glasses or clothes, the viewer has no need to stand close to the mirror display, which can improve the practicability.

DESCRIPTION OF EMBODIMENTS

Figure 1:
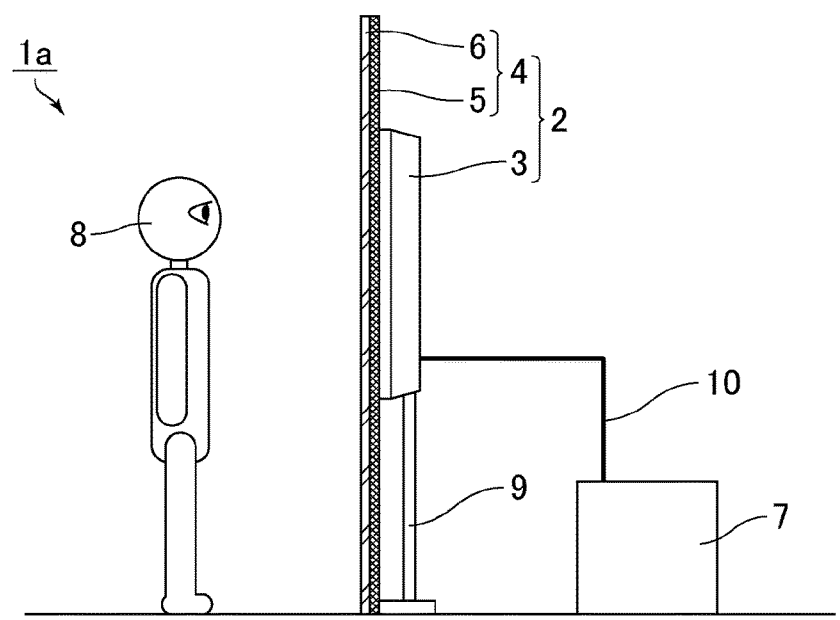
FIG. 1 is a schematic cross-sectional view illustrating a mirror display system of Embodiment 1.

The present invention will be described in detail below by way of, but not limited to, the following embodiments (examples) referring to the drawings. The configurations of the respective embodiments (examples) may be employed in appropriate combination or may be modified as long as the combination or the modification is not beyond the spirit of the present invention.

The following embodiments (examples) each describe a case where a liquid crystal display device (hereinafter, also referred to as a 3D liquid crystal display device) that displays three-dimensional (3D) video images is used as a 3D display device. However, the type of the 3D display device is not particularly limited as long as it can display 3D video images and displays a pair of video images (a video image for the left eye and a video image for the right eye) that give a parallax on the display surface of the 3D display device to enable a video image (a fused video image of the video image for the left eye and the video image for the right eye) to be perceived on the back surface side behind the display surface of the 3D display device. The 3D (liquid crystal) display device may be of any mode, such as a parallax barrier naked-eye 3D (liquid crystal) display device, a glasses-based active shutter 3D (liquid crystal) display device, a lenticular lens naked-eye 3D (liquid crystal) display device, and a glasses-based patterned retarder 3D (liquid crystal) display device. The parallax barrier and lenticular lens may be those which can electrically control the interval of barrier slits, the position of the barrier or the shape of the lens, for example, by applying the technology of the liquid crystal display panel, and are also referred to as a liquid crystal barrier and a liquid crystal lens, respectively, for example. Naked-eye 3D (liquid crystal) display devices mostly have insufficient viewing angle characteristics and a small viewing angle range (i.e. sweet spot) for 3D viewing. Accordingly, combination use with eye tracking technology (also referred to as face tracking technology or head tracking technology) is preferred which can adjust the positions of the video image for the left eye and the video image for the right eye that give a parallax and the state of the barrier or lens by tracking the movement of the face or the eyeballs of the viewer with a camera.

The term "parallax" herein means the parallax measured on the display surface of a 3D display device (e.g. a 3D liquid crystal display device 3). The term "half mirror layer" as used herein means a translucent layer with a property of reflecting incident light. The half mirror layer has a reflectance for natural light of preferably 40% or more, more preferably 50% or more. The term "reflectance" as used herein refers to "luminous reflectance" unless otherwise noted. The half mirror layer may partly absorb incident light.

Embodiment 1

Embodiment 1 relates to a mirror display system including a mirror display that includes a 3D liquid crystal display device and a half mirror plate, and a control unit, where the 3D liquid crystal display device and the half mirror plate are connectively placed.

FIG. 1 is a schematic cross-sectional view illustrating a mirror display system of Embodiment 1. As shown in FIG. 1, a mirror display system 1a includes a mirror display 2 and a control unit 7. The mirror display 2 includes, in the order from the back surface side to the viewer side, a 3D liquid crystal display device 3 and a half mirror plate 4. The 3D liquid crystal display device 3 is placed on a stand 9. The 3D liquid crystal display device 3 and the half mirror plate 4 are connectively placed. The 3D liquid crystal display device 3 and the half mirror plate 4 may be fixed by any method, such as a method in which the size of the half mirror plate 4 is made larger than the size of the display region of the 3D liquid crystal display device 3 and the 3D liquid crystal display device 3 is attached to the half mirror plate 4 with adhesive tape; and a method in which the upper and lower edges of the half mirror plate 4 are fit in a pair of aluminum rails which are attached to the upper and lower edges of the 3D liquid crystal display device 3 so as to form a frame-like structure. The control unit 7 is placed in the vicinity of the mirror display 2 and is electrically connected to the 3D liquid crystal display device 3 via a wire 10.

The 3D liquid crystal display device 3 is configured to display, by a video signal supplied from the control unit 7, a pair of video images (a video image for the left eye and a video image for the right eye) that give a parallax on the display surface of the 3D liquid crystal display device 3. This enables a video image (a fused video image of the video image for the left eye and the video image for the right eye) to be perceived on the back surface side behind the display surface of the 3D liquid crystal display device 3. The mode of the 3D liquid crystal display device 3 is not particularly limited.

The half mirror plate 4 includes, in the order from the back surface side to the viewer side, a half mirror layer 5 and a glass substrate 6 as a base material. The respective members are bonded to each other with an acrylic adhesive (not shown) in between.

The half mirror layer 5 may be a reflective polarizer, for example. Examples of the reflective polarizer include a multilayer reflective polarizer, a nano-wire grid polarizer, and a reflective polarizer utilizing selective reflection of cholesteric liquid crystals. Examples of the multilayer reflective polarizer include a reflective polarizer (trade name: DBEF) available from Sumitomo 3M Ltd. Examples of the nano-wire grid polarizer include those disclosed in Patent Literatures 5 and 6. Examples of the reflective polarizer utilizing selective reflection of cholesteric liquid crystals include a reflective polarizer (trade name: PCF) available from Nitto Denko Corporation.

The half mirror layer 5 may be any product as long as it has a beam splitter function of partly reflecting and partly transmitting incident light. The reflective polarizer may be replaced by, for example, a vapor-deposited metal film or a dielectric multilayer. In order to achieve both of the visibility of the mirror image (reflected image) and the visibility of the video image, the mirror display preferably has a structure including a liquid crystal display device (3D liquid crystal display device) and a reflective polarizer. In order to suppress the production cost, the reflective polarizer is better than the dielectric multilayer. The reflectance and the transmittance of the half mirror layer 5 are not particularly limited, and may be flexibly adjusted by increasing or decreasing the thickness of the vapor-deposited metal film or dielectric multilayer, by stacking two or more reflective polarizers such that the respective transmission axes thereof are at different azimuth angles, or by employing two or more kinds of half mirror layers. The half mirror layer 5 may have an infrared absorption function and an ultraviolet absorption function in addition to the beam splitter function.

The thickness of the glass substrate 6 is not particularly limited. The glass substrate 6 is suitably made of tempered glass. As the base material, the glass substrate 6 may be replaced by a transparent plate made of acrylic resin, for example.

The control unit 7 is configured to supply a video signal for displaying an optimum video image on the 3D liquid crystal display device 3, to the 3D liquid crystal display device 3. The type of the control unit 7 is not particularly limited. Although the control unit 7 is placed in the vicinity of the mirror display 2 in Embodiment 1, it may be integrated with (built in) the mirror display 2.

The following describes a suitable range of the parallax which sufficiently achieves the effects of the present invention.

The inventors made intensive studies about a method for sufficiently suppressing uncomfortable feeling between the mirror image and the video image, with a focus on a parallax, and found that the parallax is preferably made larger than in conventional 3D display devices displaying 3D video images.

Meanwhile, in conventional 3D display devices, video images with a large parallax are said to tend not to be perceived as a 3D image. In other words, in a conventional 3D display device utilizing a parallax, if a pair of video images (a video image for the left eye and a video image for the right eye) with a large parallax is displayed, the video image for the left eye and the video image for the right eye fail to be fused (remain as a double vision), failing in achieving 3D viewing. This is because the lenses of the eyeballs are focused on the display surface of the 3D display device while the displayed 3D video image is perceived at a position different from the display surface of the 3D display device because of a phenomenon in which a conflict occurs between lens accommodation and convergence.

Figure 2:
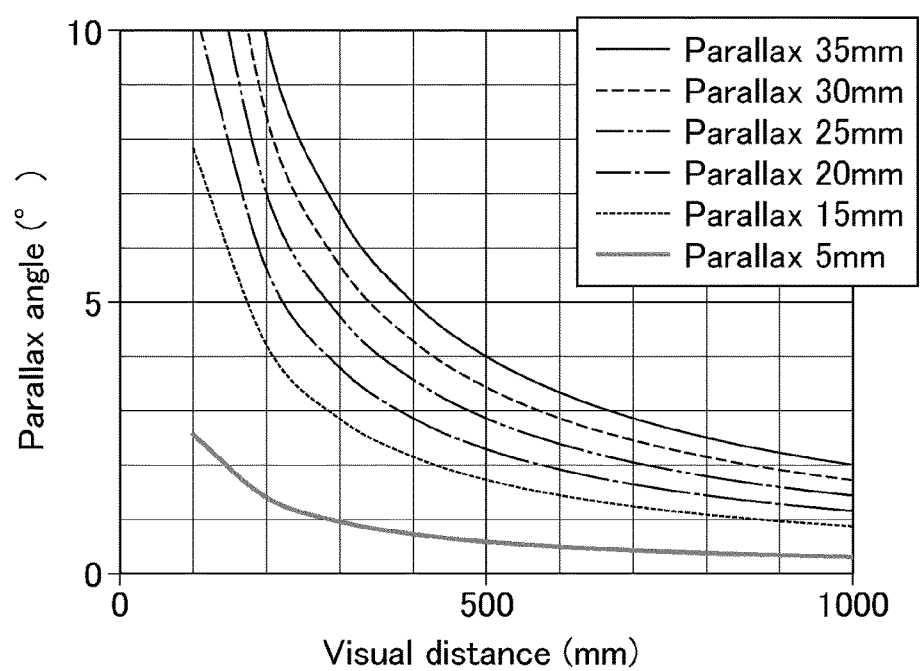
FIG. 2 is a graph showing a relation between the parallax angle and the visual distance when the pupillary distance of a viewer is 70 mm.

A limit within which 3D viewing is achieved, i.e., a fusion limit, is often determined with reference to the corresponding parallax angle. The parallax angle as used herein means the difference (absolute value) between the convergence angle for viewing a video image perceived by a parallax and the convergence angle for viewing a point on the display surface of the 3D display device. Since the fusion limit widely varies between individuals, if an unspecified large number of viewers are targeted, the parallax angle is preferably set to not larger than 2° (e.g. the guidelines of 3D Consortium, GL-9). FIG. 2 is a graph showing a relation between the parallax angle and the visual distance when the pupillary distance of a viewer is 70 mm. The term "visual distance" as used herein means the distance between the display surface of the half mirror plate 4 and the pupils (eyes) of a viewer 8. As shown in FIG. 2, parallaxes are not in one-to-one relation with parallax angles, and different visual distances bring different parallaxes even at the same parallax angle. In the case where a mirror display is viewed at a visual distance of 600 mm, setting the parallax angle to not larger than 2° corresponds to setting the parallax not longer than 20 mm. Here, the case with a visual distance of 600 mm is taken as an example under assumption of standard usage such as virtual fitting. As mentioned above, under the assumption that a mirror display is viewed at a visual distance of about 600 mm, the parallax is conventionally controlled so as not to exceed about 20 mm.

Meanwhile, the inventors found the following fact through studies. That is, in a mirror display composed of a 3D display device and a half mirror plate, when a viewer observes a mirror image, the lenses of the viewer automatically try to focus on the same plane (position) as the plane (position) where he/she perceives the video image, and the convergence angle follows the focal point. As a result, even video images with a large parallax tend to be fused (the fusion limit is large). Specifically, when a mirror image and a video image are simultaneously perceived in a mirror display system, a video image for the left eye and a video image for the right eye tend to be fused even in the case of a larger parallax, compared to the cases where 3D images are displayed by conventional 3D display devices. The inventors thereby found that utilizing this phenomenon enables the video image to be perceived at a position sufficiently away on the back surface side behind the display surface of the 3D display device. Accordingly, the inventors found that when a 3D display device displays, by a video signal supplied from a control unit, a pair of video images (a video image for the left eye and a video image for the right eye) that give a parallax of not shorter than 25 mm which is longer than in conventional cases, the display device can bring the mirror image and video image sufficiently close to positions with the same depth. Thus, in order to sufficiently achieve the effects of the present invention, the parallax is preferably not shorter than 25 mm. The same shall apply to Embodiment 2 described later.

The following describes display of an optimum video image on the 3D liquid crystal display device 3 in the mirror display system of Embodiment 1, in the case of virtual fitting of glasses as an example.

Figure 3:
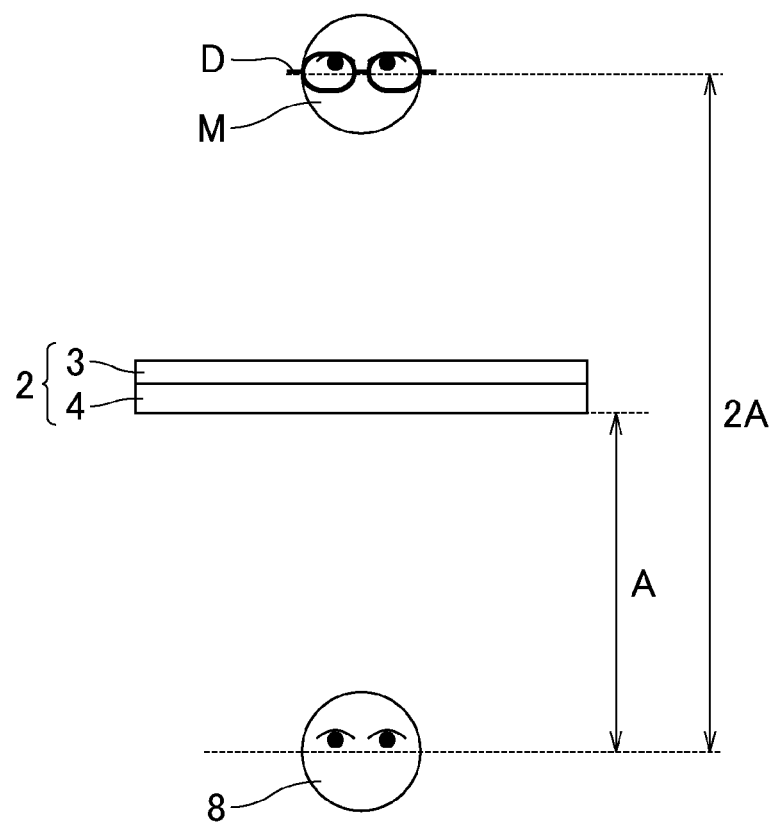
FIG. 3 is a schematic view showing a relation between a mirror image and a video image in the mirror display system of Embodiment 1.

FIG. 3 is a schematic view showing a relation between a mirror image and a video image in the mirror display system of Embodiment 1. As shown in FIG. 3, when the viewer 8 stands at a position which is a distance A away from the half mirror plate 4, the mirror image M of the viewer 8 reflected in the half mirror plate 4 is perceived at a position which is a distance 2A away from the viewer 8. In other words, the mirror image M reflected by the half mirror plate 4 is perceived not on the display surface of the half mirror plate 4 but on the back surface side behind the half mirror plate 4. According to the optical theory, the mirror image M is shown in the mirror such that the mirror image M and the viewer 8 are symmetrical with respect to the display surface of the half mirror plate 4.

The mirror display system of Embodiment 1, which uses the 3D liquid crystal display device 3, enables a video image D (a fused video image of a video image for the left eye and a video image for the right eye) of the display (glasses) to be perceived on the back surface side behind the display surface of the 3D liquid crystal display device 3. As a result, the mirror image M and the video image D can be brought close to positions with the same depth. Furthermore, displaying the video image D at a position with the same depth as the position of the mirror image M by the 3D liquid crystal display device 3 enables simultaneous perception of the mirror image M and the video image D without uncomfortable feeling. Thereby, the system can achieve applications such as a virtual fitting system. The phrase "positions with the same depth" as used herein means not only one point with the same depth but also any positions in a plane with the same depth. The phrase "an optimum video image is displayed on a 3D display device" as used herein means that, as described above, the video image D is displayed at a position with the same depth as the position of the mirror image M. Although the position of the mirror image M preferably perfectly corresponds to the position of the video image D, the effects of the present invention can be achieved as long as the mirror image M and the video image D are brought close to positions with the same depth.

Figure 4:
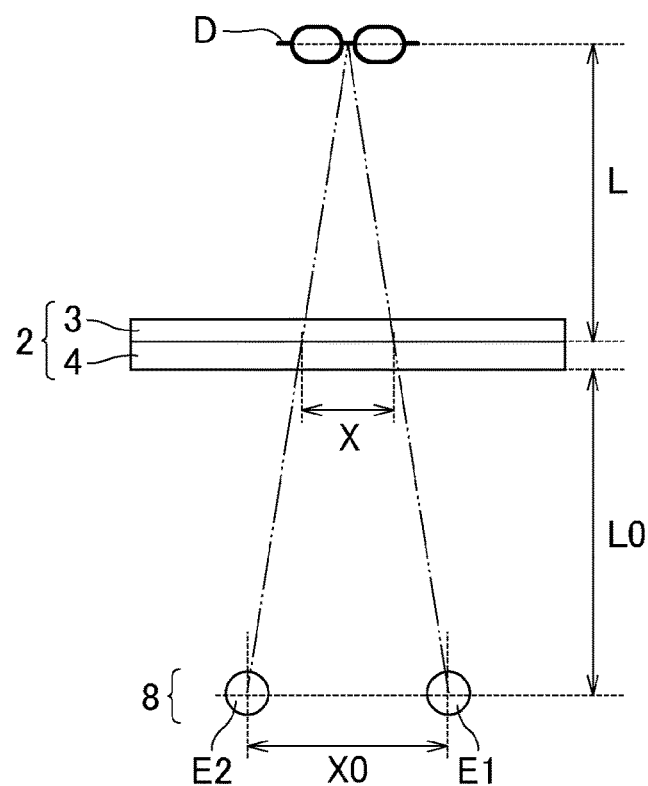
FIG. 4 is a schematic view showing a relation between a viewer and a video image perceived by the viewer in the mirror display system of Embodiment 1.

Next, the following describes a method for displaying an optimum video image on the 3D liquid crystal display device 3, in the case of using a 3D liquid crystal display device utilizing a parallax as an example. FIG. 4 is a schematic view showing a relation between a viewer and a video image perceived by the viewer in the mirror display system of Embodiment 1. As shown in FIG. 4, a visual distance L0 is defined as the distance between the display surface of the half mirror plate 4 and pupils (eyes) E1 and E2 of the viewer 8, and a depth L is defined as the distance between the position where the video image D displayed by the 3D liquid crystal display device 3 is perceived and the display surface of the 3D liquid crystal display device 3. Also, X0 is defined as the pupillary distance (the distance between the pupils E1 and E2) of the viewer 8, and X is defined as the parallax of the video images displayed by the 3D liquid crystal display device 3. Here, the parallax X represents the value measured on the display surface of the 3D liquid crystal display device 3. According to the above definitions, a relation $L:X=(L+L0):X0$ is given, which can be converted to a relation formula: $L/L0=X/(X0-X)$. Here, when an optimum video image is displayed on the 3D liquid crystal display device 3, a relation $L=L0$ (i.e. $L/L0=1$) is given as mentioned above. The above relation formulas give: $X=X0/2$ (hereinafter, also referred to as an optimum parallax X1). In other words, in order to display an optimum video image on the 3D liquid crystal display device 3 in Embodiment 1, the parallax X should be half of the pupillary distance X0.

Figure 5:
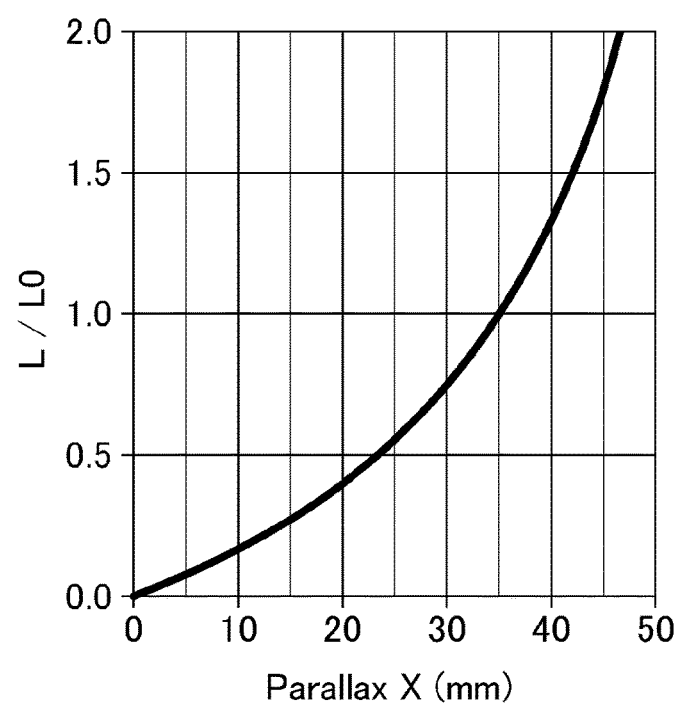
FIG. 5 is a graph showing a relation between the ratio of the depth to the visual distance and the parallax when the pupillary distance of the viewer is 70 mm in the mirror display system of Embodiment 1.

For example, if the pupillary distance X0 of the viewer 8 is 70 mm, the relation $L/L0=1$ can be satisfied by setting the parallax X to 35 mm (optimum parallax X1=35 mm) as shown in FIG. 5. FIG. 5 is a graph showing a relation between the ratio of the depth to the visual distance and the parallax when the pupillary distance of the viewer is 70 mm in the mirror display system of Embodiment 1.

Figure 6:
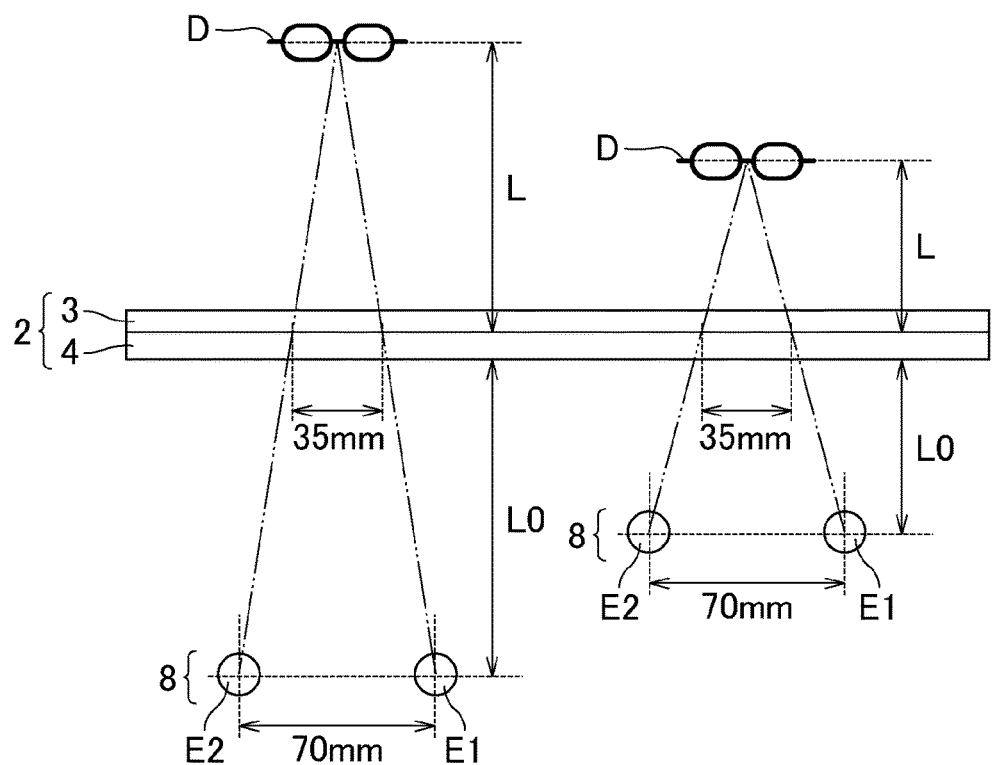
FIG. 6 is a schematic view showing the states where the ratio of the depth to the visual distance is 1 when the pupillary distance of the viewer is 70 mm in the mirror display system of Embodiment 1.

Since the optimum parallax X1 is independent of the visual distance L0, there is no need for tracking the distance between the display surface of the half mirror plate 4 and the pupils E1 and E2 of the viewer 8 with a device such as a length measurement sensor to frequently calculate the optimum parallax X1 for correction. For example, if the pupillary distance X0 of the viewer 8 is 70 mm, the relation $L/L0=1$ can be always satisfied by setting the parallax X to 35 mm (optimum parallax X1=35 mm) without considering the visual distance L0, as shown in FIG. 6. FIG. 6 is a schematic view showing the states where the ratio of the depth to the visual distance is 1 when the pupillary distance of the viewer is 70 mm in the mirror display system of Embodiment 1. In FIG. 6, the left state shows a case where the visual distance L0 is relatively long and the right state shows a case where the visual distance L0 is relatively short. The figure shows that the both states can satisfy the relation $L/L0=1$ independently of the visual distance L0.

The method for setting the optimum parallax X1 and the process for generating a video signal giving the optimum parallax X1 are not particularly limited. The pupillary distance of a human being is generally 50 mm to 70 mm. Accordingly, examples thereof may include a method in which a video signal giving a parallax of 30 mm which corresponds to the average pupillary distance 60 mm is generated as a video signal giving an optimum parallax X1 and video images with the parallax are played with the player of the control unit 7. The video signal giving the parallax may be generated inside the control unit 7, or may be previously generated with a different device (system) and the resulting data may be transferred to the control unit 7. A video signal giving a parallax may be generated by any method used in conventional 3D displays, such as a method of halving the horizontal resolutions of a video image for the left eye and a video image for the right eye, arranging the video images side-by-side on the left and right, and storing the video images as a side-by-side video image file; and a method of integrally storing a video image for the left eye and a video image for the right eye as a multi picture object (MPO) file.

Here, it should be noted that even if the same video signal is supplied from the control unit 7 to the 3D liquid crystal display device 3, the parallax varies depending on the screen size of the 3D liquid crystal display device 3. In other words, the screen size of the 3D liquid crystal display device 3 should be checked before generating a video signal giving a parallax. Each video signal giving an optimum parallax may be generated for each screen size, or the control unit 7 may be provided with a function of adjusting the parallax according to the screen size.

The following are examples in each of which the mirror display system of Embodiment 1 was actually produced.

Example 1

Example 1 is a case where the 3D liquid crystal display device 3 displays video images with a parallax of 30 mm.

The size of the half mirror plate 4 was made larger than the size of the display region of the 3D liquid crystal display device 3. The 3D liquid crystal display device 3 was attached to the half mirror plate 4 with adhesive tape (not shown). Black tape (not shown) was attached to the back-surface-side surface of the half mirror plate 4 in the region not overlapping the display region of the 3D liquid crystal display device 3. Light-shielding of the above region with the black tape can maintain the function of the half mirror plate 4. The distance between the display surface of the 3D liquid crystal display device 3 and the display surface of the half mirror plate 4 was 2 mm.

The 3D liquid crystal display device 3 used was a parallax barrier naked-eye 3D liquid crystal display device (trade name: RockVision 3D, screen size: 151 mm×90 mm) available from I-O Data Device, Inc. The transmission axis of the viewer-side absorptive polarizer (not shown) was at an azimuth angle of 45°, provided that the degree of azimuth angle is defined to be positive (+) in the counterclockwise direction starting from the long side of the 3D liquid crystal display device 3. The azimuth angles of the axes are described on the basis of the above definition hereinbelow. In Example 1, the display surface of the 3D liquid crystal display device 3 corresponds to the viewer-side surface of the viewer-side absorptive polarizer.

The half mirror layer 5 used was a multilayer reflective polarizer (trade name: DBEF) available from Sumitomo 3M Ltd., which has succeeded in mass production of a multilayer reflective polarizer with a large area at low cost. The reflective polarizer was placed such that the transmission axis was at an azimuth angle of 45°. The glass substrate 6 had a thickness of 2.5 mm. In Example 1, the display surface of the half mirror plate 4 corresponds to the viewer-side surface of the half mirror layer 5 (reflective polarizer).

In the half mirror plate 4, the reflectance of the incident light from the viewer side was 55% and the transmittance of the incident light from the back surface side was 90%.

The control unit 7 used was a commercially available personal computer in which a software program has been installed. In Example 1, a previously generated MPO video signal giving a parallax of 30 mm was transferred to the control unit 7, and video images with the parallax were played with the player of the control unit 7.

The mirror display system of Example 1, which uses the 3D liquid crystal display device 3, can bring the mirror image and video image close to positions with the same depth. Moreover, if the pupillary distance of the viewer 8 is 60 mm, video images with an optimum parallax of 30 mm are displayed by the 3D liquid crystal display device 3. Thus, the mirror image and video image can be perceived at positions with the same depth, and thus the mirror image and video image are simultaneously perceptible without uncomfortable feeling.

Example 2

Example 2 is a case with more parallax options than in Example 1. Since the mirror display system of Example 2 is the same as the mirror display system of Example 1 except for the above configuration, the description of the same respects is omitted here.

In Example 2, MPO video signals giving a parallax of 25 mm, 30 mm, or 35 mm were previously generated so that the viewer 8 could select one of them.

The mirror display system of Example 2, which uses the 3D liquid crystal display device 3, can bring the mirror image and video image close to positions with the same depth. Furthermore, if the pupillary distance of the viewer 8 is 50 mm, 60 mm, or 70 mm, the 3D liquid crystal display device 3 displays a video image with a corresponding optimum parallax of 25 mm, 30 mm, or 35 mm. Thus, the mirror image and video image can be perceived at positions with the same depth, and thereby simultaneously perceptible without uncomfortable feeling. Moreover, the mirror display system of Example 2, which provides more parallax options than the mirror display system of Example 1, can enhance the practicality.

Example 3

Example 3 is a case where the viewer 8 can flexibly adjust the parallax. Since the mirror display system of Example 3 is the same as the mirror display system of Example 1 except for the above configuration, the description of the same respects is omitted here.

The mirror display system of Example 3 was designed such that the viewer 8 could increase or decrease an initial parallax value previously set to 30 mm to a desired value with an operation tool such as a button. The video signal giving a parallax was generated inside the control unit 7.

The mirror display system of Example 3, which uses the 3D liquid crystal display device 3, can bring the mirror image and video image close to positions with the same depth. Furthermore, the system, which allows flexible adjustment of the parallax, can display video images with an optimum parallax corresponding to the pupillary distance of the viewer 8. Thus, the mirror image and video image can be perceived at positions with the same depth, and thereby simultaneously perceptible without uncomfortable feeling. Moreover, since the mirror display system of Example 3 provides any viewer 8 (regardless of the pupillary distance) with video images with a constant parallax of 30 mm as an initial value, the control unit 7 may have a more simple configuration than in Examples 4 to 9 described below.

Example 4

Example 4 is a case where the optimum parallax is customized for each viewer 8. Since the mirror display system of Example 4 is the same as the mirror display system of Example 1 except for the above configuration, the description of the same respects is omitted here.

As mentioned above, the mirror display system of Example 1 was designed to generate a video signal giving a parallax of 30 mm as an optimum parallax for the average pupillary distance 60 mm of a human being, and to play video images with the parallax with the player of the control unit 7. In order to improve the quality of applications such as a virtual fitting system by displaying more appropriate video images (video images with an optimum parallax for each viewer), and in order to sufficiently prevent eyestrain or the like caused by inappropriate video images (video images with a non-optimum parallax for each viewer), the optimum parallax is preferably customized for each viewer. The mirror display system of Example 4 can provide video images with an optimum parallax for each viewer.

The mirror display system of Example 4 was designed to require the viewer 8 to give his/her own pupillary distance, and to employ the halved value of the given pupillary distance as the optimum parallax. The method for customizing an optimum parallax for each viewer 8 is not particularly limited. The viewer 8 may give the pupillary distance by, for example, measuring his/her own pupillary distance with a tool such as a ruler and inputting the measurement result into the control unit 7. The video signal giving a parallax was generated inside the control unit 7.

The mirror display system of Example 4, which uses the 3D liquid crystal display device 3, can bring the mirror image and video image close to positions with the same depth. Furthermore, since video images with an optimum parallax customized for each viewer 8 are displayed, the mirror image and video image can be perceived at positions with the same depth, and thereby are simultaneously perceptible without uncomfortable feeling.

Example 5

Example 5 is a case where the optimum parallax is customized for each viewer 8 by a method different from that in Example 4. Since the mirror display system of Example 5 is the same as the mirror display system of Example 4 except for the above configuration, the description of the same respects is omitted here.

The mirror display system of Example 5 was designed to require the viewer 8 to give his/her own age and sex so that the mirror display system could estimate the pupillary distance from the given information referring to an appropriate database, and to employ the halved value of the estimated pupillary distance as the optimum parallax. The video signal giving a parallax was generated inside the control unit 7.

The mirror display system of Example 5, which uses the 3D liquid crystal display device 3, can bring the mirror image and video image close to positions with the same depth. Furthermore, since video images with an optimum parallax customized for each viewer 8 are displayed, the mirror image and video image can be perceived at positions with the same depth, and thereby are simultaneously perceptible without uncomfortable feeling.

Example 6

Example 6 is a case where the optimum parallax is customized for each viewer 8 by a method different from those in Examples 4 and 5. Since the mirror display system of Example 6 is the same as the mirror display systems of Examples 4 and 5 except for the above configuration, the description of the same respects is omitted here.

The mirror display system of Example 6 was designed to measure the pupillary distance on a face photograph of the viewer 8 taken with a camera, and to employ the halved value of the measured pupillary distance as the optimum parallax. In this case, combination use with a length measurement sensor (e.g. infrared sensor) that can measure the distance between the camera and the viewer 8 can enhance the measurement accuracy for the pupillary distance. The video signal giving a parallax was generated inside the control unit 7.

The mirror display system of Example 6, which uses the 3D liquid crystal display device 3, can bring the mirror image and video image close to positions with the same depth. Furthermore, since video images with an optimum parallax customized for each viewer 8 are displayed, the mirror image and video image can be perceived at positions with the same depth, and thereby are simultaneously perceptible without uncomfortable feeling.

Example 7

Example 7 is a case where the optimum parallax customized for each viewer 8 can be finely adjusted. Since the mirror display system of Example 7 is the same as the mirror display system of Example 4 except for the above configuration, the description of the same respects is omitted here.

As mentioned above, the mirror display systems of Examples 4 to 6 were each designed to provide video images with an optimum parallax customized for each viewer. However, the optimum parallax in Embodiment 1, which is the halved value of the pupillary distance, is larger than the parallax of usual 3D video image, which may cause eyestrain. This problem can be solved by optional fine adjustment of the optimum parallax customized for each viewer which achieves video images with a parallax more comfortable for the viewer. The mirror display system of Example 7 can finely adjust the optimum parallax set by the same method as in Example 4.

The mirror display system of Example 7 was designed to in turn or simultaneously provide several test patterns (video images) with a parallax around the optimum parallax set in Example 4 so that the viewer 8 could select a pattern he/she feels more comfortable. The video signal giving a parallax was generated inside the control unit 7.

The mirror display system of Example 7, which uses the 3D liquid crystal display device 3, can bring the mirror image and video image close to positions with the same depth. Furthermore, since the optimum parallax customized for each viewer 8 can be finely adjusted according to need, the viewer 8 can select video images with a more comfortable parallax.

Example 8

Example 8 is a case where the optimum parallax customized for each viewer 8 can be finely adjusted by a method different from that in Example 7. Since the mirror display system of Example 8 is the same as the mirror display system of Example 7 except for the above configuration, the description of the same respects is omitted here.

The mirror display system of Example 8 was designed to enable the viewer 8 to increase or decrease the optimum parallax set in Example 4 to a desired value with an operation tool such as a button. The video signal giving a parallax was generated inside the control unit 7.

The mirror display system of Example 8, which uses the 3D liquid crystal display device 3, can bring the mirror image and video image close to positions with the same depth. Furthermore, since the optimum parallax customized for each viewer 8 can be finely adjusted according to need, the viewer 8 can select video images with a more comfortable parallax.

Example 9

Example 9 is a case where the optimum parallax customized for each viewer 8 can be finely adjusted by a method different from those in Examples 7 and 8. Since the mirror display system of Example 9 is the same as the mirror display systems of Examples 7 and 8 except for the above configuration, the description of the same respects is omitted here.

The mirror display system of Example 9 was designed such that a slightly smaller parallax could be selected by multiplying a constant (e.g. 0.9, 0.8, 0.7) by the optimum parallax set in Example 4. The video signal giving a parallax was generated inside the control unit 7.

The mirror display system of Example 9, which uses the 3D liquid crystal display device 3, can bring the mirror image and video image close to positions with the same depth. Furthermore, since the optimum parallax customized for each viewer 8 can be finely adjusted according to need, the viewer 8 can select video images with a more comfortable parallax.

Parallax setting by one of the methods of Examples 4 to 9 needs at least initial setting at the timing of first use of the mirror display system. Additionally, appropriate resetting and fine adjustment are preferred during use of the mirror display system. Also, in the case where one mirror display system is assumed to be shared by multiple members on separate occasions, setting the parallax every time the user changes may be troublesome. Accordingly, the parallaxes set for the respective users are preferably recorded (stored) with the user names by the control unit 7. This enables each user to instantly use the mirror display system without setting the parallax by one of the methods of Examples 4 to 9 for each time. For example, if the control unit 7 has recorded the optimum parallax set by one of the methods of Examples 4 to 6, only fine adjustment by one of the methods of Examples 7 to 9 is required as needed.

Figure 7:
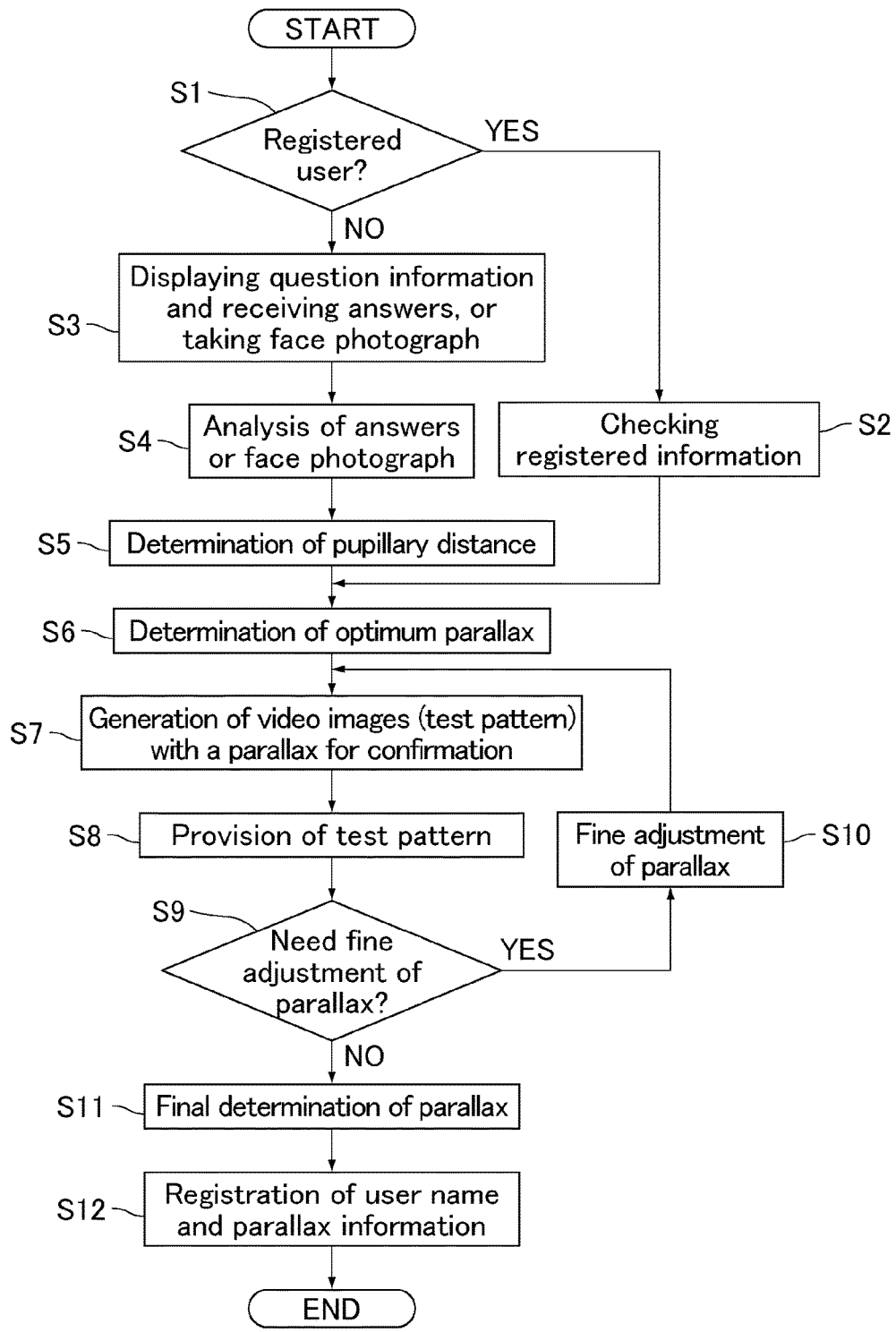
FIG. 7 is a flowchart showing an example of steps of setting a parallax in Examples 4 to 9.

An example of steps of setting the parallax by one of the methods of Examples 4 to 9 is described referring to the flowchart shown in FIG. 7. FIG. 7 is a flowchart showing an example of steps of setting a parallax in Examples 4 to 9.

First, whether the viewer 8 who is going to use the mirror display system has been registered or not is confirmed (S1). The confirmation of whether the viewer 8 is registered or not is performed as follows. The viewer 8 selects one of "registered user" and "non-registered user" displayed on an input device (in the case of a registered user, the viewer 8 also inputs the registered number and other information), and the selected information is output from the input device to the control unit 7. If the viewer is registered, the registered information recorded on the control unit 7 is output to the input device and then displayed on the input device. The viewer 8 checks the registered information and selects "OK" displayed on the input device when he/she finds no problems (S2). Subsequently, the information that no problems are included in the registered information is output from the input device to the control unit 7, and the optimum parallax is determined by the control unit 7 on the basis of the registered information (S6). If the user is non registered, question information is output from the control unit 7 to the input device, and the viewer 8 answers the questions (e.g. pupillary distance, age, sex) displayed on the question screen of the input device, as described in Examples 4 and 5 (S3). As described in Example 6, a face photograph of the viewer 8 may also be taken in some cases (S3). Subsequently, the answer information to the questions and face photograph information are output to the control unit 7. The control unit 7 analyzes the answers or the face photograph (S4), thereby determines the pupillary distance (S5), and then determines the optimum parallax which is the halved value of the pupillary distance (S6). Next, video images with the optimum parallax determined by the control unit 7 are generated inside the control unit 7 (S7). A video signal of the images is supplied from the control unit 7 to the 3D liquid crystal display device 3, and a pair of video images is provided as a test pattern (S8). Subsequently, whether the parallax (optimum parallax) needs fine adjustment or not is checked (S9). The necessity of the fine adjustment of the parallax is checked as follows: the viewer 8 selects one of "fine adjustment" and "no fine adjustment" displayed on the input device and the selected information is output from the input device to the control unit 7. When fine adjustment is needed, the parallax is finely adjusted by one of the methods of Examples 7 to 9 (S10). After video images with the finely adjusted parallax are generated inside the control unit 7 (S7), a video signal of the images is supplied from the control unit 7 to the 3D liquid crystal display device 3 and a pair of video images is provided as a test pattern (S8). Such a flow is repeated until the parallax has no need for fine adjustment, and then the viewer 8 inputs the number of the test pattern to the input device (or selects one of the numbers of the test patterns displayed on the input device). Thereby, the information is output from the input device to the control unit 7, and the parallax is finally determined (S11). If no fine adjustment is needed, the initial parallax is employed without adjustment (the optimum parallax is employed as the final parallax) (S11). At last, the finally determined parallax is registered (recorded) in the control unit 7 along with the user name (S12), and the user can use the registered information next time. Then, after video images with the finally determined parallax are generated inside the control unit 7, a video signal of the images is supplied from the control unit 7 to the 3D liquid crystal display device 3, and the video images are displayed on the 3D liquid crystal display device 3.

Example 10

Example 10 is a case where the modes of the 3D liquid crystal display device 3 and the half mirror layer 5 are different from those of Example 1. Since the mirror display system of Example 10 is the same as the mirror display system of Example 1 except for the above configuration, the description of the same respects is omitted here.

In Example 10, the 3D liquid crystal display device 3 used was a glasses-based active shutter 3D liquid crystal display device (trade name: LC60-XL9, screen size: 1771 mm×996 mm) available from Sharp Corporation. The half mirror layer 5 used was a dielectric multilayer (trade name: Suncut® Σ Clear (SKFC)) with a reflectance of 40% and a transmittance of 60% available from Asahi Glass Co., Ltd.

Even if the modes of the 3D liquid crystal display device and the half mirror layer are different from those of Example 1 as in the mirror display system of Example 10, the same effects as in Example 1 can be obviously achieved.

Example 11

Example 11 is a case where the modes of the 3D liquid crystal display device 3 and the half mirror layer 5 are different from those of Example 1. Since the mirror display system of Example 11 is the same as the mirror display system of Example 1 except for the above configuration, the description of the same respects is omitted here.

In Example 11, the 3D liquid crystal display device 3 used was a liquid crystal lens and naked-eye 3D liquid crystal display device (trade name: dynabook T852, screen size: 345 mm×194 mm) provided with an eye tracking feature available from Toshiba Corporation. The half mirror layer 5 used was the same dielectric multilayer (trade name: Suncut® Σ Clear (SKFC)) with a reflectance of 40% and a transmittance of 60% available from Asahi Glass Co., Ltd., as used in Example 10.

Even if the modes of the 3D liquid crystal display device and the half mirror layer are different from those of Example 1 as in the mirror display system of Example 11, the same effects as in Example 1 can be obviously achieved. Besides, compared to the mirror display system of Example 1 using a naked-eye 3D liquid crystal display device without eye tracking feature, the mirror display system of the present example had a wider viewing angle for 3D viewing and higher practicality as a mirror display system applicable to virtual fitting.

Embodiment 2

Embodiment 2 relates to a mirror display system including a mirror display that includes a 3D liquid crystal display device and a half mirror plate, and a control unit, where the 3D liquid crystal display device and the half mirror plate are placed apart. Since the mirror display system of Embodiment 2 is the same as the mirror display system of Embodiment 1 except for the above configuration, the description of the same respects is omitted here.

Figure 8:
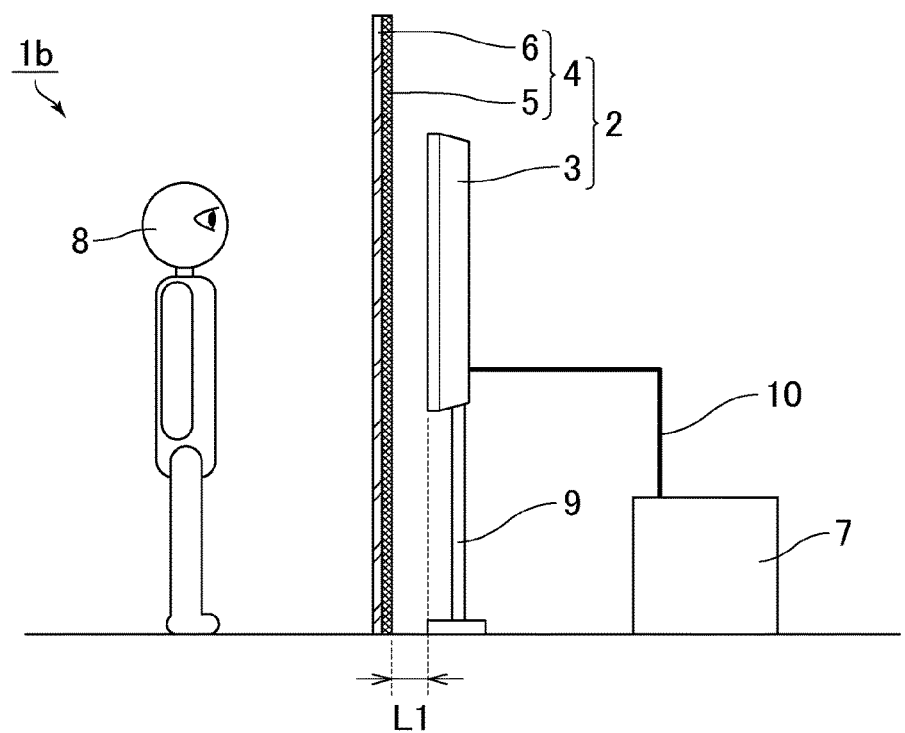
FIG. 8 is a schematic cross-sectional view illustrating a mirror display system of Embodiment 2.

FIG. 8 is a schematic cross-sectional view illustrating a mirror display system of Embodiment 2. As shown in FIG. 8, a mirror display system 1b includes the mirror display 2 and the control unit 7. The mirror display 2 includes, in the order from the back surface side to the viewer side, the 3D liquid crystal display device 3 and the half mirror plate 4. The 3D liquid crystal display device 3 is placed on the stand 9. The 3D liquid crystal display device 3 and the half mirror plate 4 are placed at an interval of a distance L1. The control unit 7 is placed in the vicinity of the mirror display 2, and is electrically connected to the 3D liquid crystal display device 3 via the wire 10.

Figure 9:
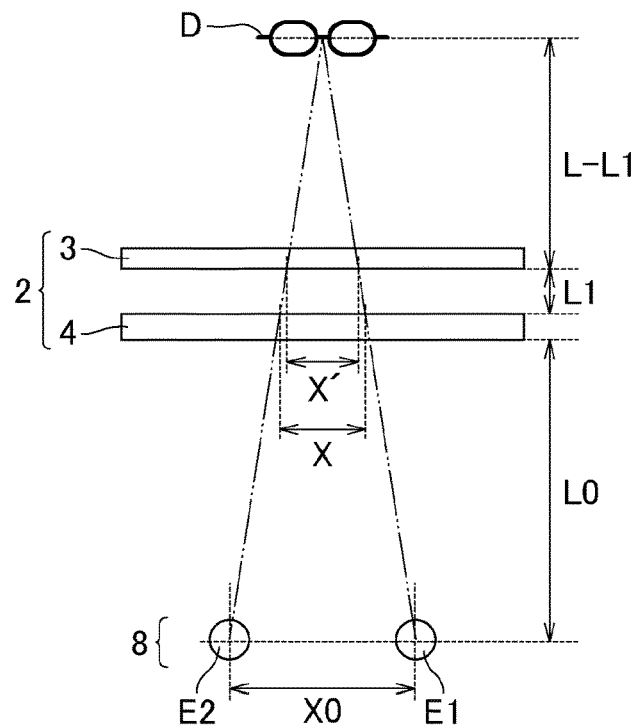
FIG. 9 is a schematic view showing a relation between a viewer and a video image perceived by the viewer in the mirror display system of Embodiment 2.

The following describes a method for displaying an optimum video image on the 3D liquid crystal display device 3 in the mirror display system of Embodiment 2, in the case of a 3D liquid crystal display device utilizing a parallax as an example. FIG. 9 is a schematic view showing a relation between a viewer and a video image perceived by the viewer in the mirror display system of Embodiment 2. As shown in FIG. 9, if the 3D liquid crystal display device 3 and the half mirror plate 4 are placed at an interval of the distance L1, which is different from the state shown in FIG. 4 (the state where the 3D liquid crystal display device 3 and the half mirror plate 4 are in contact with each other), the distance between the position where the video image D displayed by the 3D liquid crystal display device 3 is perceived and the display surface of the 3D liquid crystal display device 3 is represented by L−L1. The distance L1 denotes the distance between the viewer-side surface of the 3D liquid crystal display device 3 and the back-surface-side surface of the half mirror plate 4. Also, in the same manner as in FIG. 4, the visual distance L0 is defined as the distance between the display surface of the half mirror plate 4 and the pupils (eyes) E1 and E2 of the viewer 8, X0 as the pupillary distance (distance between the pupils E1 and E2) of the viewer 8, and X as the parallax between the video images displayed by the 3D liquid crystal display device 3 in Embodiment 1. Here, when X' is defined as the parallax between the video images displayed by the 3D liquid crystal display device 3 in Embodiment 2, a relation L:X=(L−L1):X' is given. This can be converted to a relation formula: X'=X(1−L1/L). Here, as mentioned above, when an optimum video image is displayed on the 3D liquid crystal display device 3, the relations L=L0 and X=X0/2 are given, and thus the following formula (2) is given from the above relation formulas. The symbol X' of this case is also referred to as an optimum parallax X1'.

[Math. 1]

$$X' = \frac{X0}{2}\left(1 - \frac{L1}{L0}\right) \quad (2)$$

From the formula (2), when L0>L1, a relation X1'<X0/2=X1 is given. In other words, placing the 3D liquid crystal display device 3 and the half mirror plate 4 apart (Embodiment 2) can decrease the optimum parallax compared to the case where the 3D liquid crystal display device 3 and the half mirror plate 4 are connectively placed (Embodiment 1). As already mentioned, a 3D video image displayed by a mirror display has a larger fusion limit than conventional 3D video images, and thus even video images with a large parallax tend to achieve 3D viewing (tend to be fused together). Meanwhile, in order to more surely fuse video images, the parallax is preferably minimized in some cases. The mirror display system of Embodiment 2 can meet such a demand. When L0=L1, a two-dimensional (2D) video image with the parallax X' of 0 is provided. In other words, there is no need for using a 3D display device. Incidentally, a case satisfying the relation of L1=0 indicates the state of Embodiment 1, and as already mentioned, the relation X'=X0/2=X1 is given.

The following are examples in each of which the mirror display system of Embodiment 2 was actually produced.

Example 12

Example 12 is a case where the 3D liquid crystal display device 3 and the half mirror plate 4 are placed at an interval of 60 mm.

In Example 12, the visual distance L0 was 600 mm, the distance L1 between the 3D liquid crystal display device 3 and the half mirror plate 4 was 60 mm.

The optimum parallax X1' in Example 12 is: X1'=0.9× X0/2. Thus, the optimum parallax can be decreased by 10% compared to the case where the 3D liquid crystal display device 3 and the half mirror plate 4 are connectively placed (Embodiment 1). For example, if the pupillary distance of the viewer 8 is 60 mm (X0=60 mm), the optimum parallax X1' can be decreased to 27 mm.

Example 13

Example 13 is a case where the 3D liquid crystal display device 3 and the half mirror plate 4 are placed at an interval of 120 mm. Since the mirror display system of Example 13 is the same as the mirror display system of Example 12 except for the above configuration, the description of the same respects is omitted here.

In Example 13, the visual distance L0 was 600 mm, the distance L1 between the 3D liquid crystal display device 3 and the half mirror plate 4 was 120 mm.

The optimum parallax X1' in Example 13 is: X1'=0.8×X0/2. Thus, the optimum parallax can be decreased by 20% compared to the case where the 3D liquid crystal display device 3 and the half mirror plate 4 are connectively placed (Embodiment 1). For example, if the pupillary distance of the viewer 8 is 60 mm (X0=60 mm), the optimum parallax X1' can be decreased to 24 mm.

Example 14

Example 14 is a case where the 3D liquid crystal display device 3 and the half mirror plate 4 are placed at an interval of 180 mm. Since the mirror display system of Example 14 is the same as the mirror display system of Example 12 except for the above configuration, the description of the same respects is omitted here.

In Example 14, the visual distance L0 was 600 mm, the distance L1 between the 3D liquid crystal display device 3 and the half mirror plate 4 was 180 mm.

The optimum parallax X1' in Example 14 is: X1'=0.7×X0/2. Thus, the optimum parallax can be decreased by 30% compared to the case where the 3D liquid crystal display device 3 and the half mirror plate 4 are connectively placed (Embodiment 1). For example, if the pupillary distance of the viewer 8 is 60 mm (X0=60 mm), the optimum parallax X1' can be decreased to 21 mm.

Although the mirror display systems of Embodiments 1 and 2 employed the structure in which the control unit 7 was disposed in the vicinity of the mirror display 2, the systems may employ a structure in which the control unit 7 is integrated with the mirror display 2. For example, the mirror display 2 and the control unit 7 may be integrated by housing them in a dedicated case. Alternatively, the systems may serve as a digital signage display including members such as a software program and a case, or as a product like a portable game machine including a small built-in control unit. Examples of such a structure include a structure in which the control unit 7 is integrated with the mirror display 2 in the mirror display systems of Examples 1 to 14.

Even if video images with a parallax of larger than 0 mm but smaller than 25 mm are displayed, the fused video image can be perceived on the back surface side behind the display surface of the 3D liquid crystal display device. Thus, the mirror image and video image can be obviously brought close to positions with the same depth.

Comparative Example 1

Comparative Example 1 is a case where the 3D liquid crystal display device gives a parallax of 0 mm, i.e., provides 2D display and includes no control unit.

Figure 10:
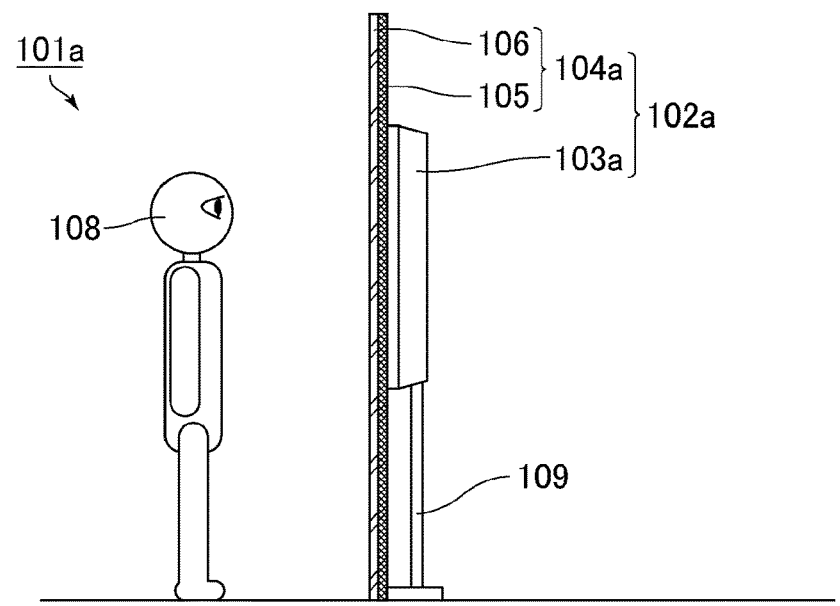
FIG. 10 is a schematic cross-sectional view illustrating a mirror display system of Comparative Example 1.

FIG. 10 is a schematic cross-sectional view illustrating a mirror display system of Comparative Example 1. As shown in FIG. 10, a mirror display system 101a includes a mirror display 102a. The mirror display 102a includes, in the order from the back surface side to the viewer side, a 3D liquid crystal display device 103a and a half mirror plate 104a. The 3D liquid crystal display device 103a is placed on a stand 109. The 3D liquid crystal display device 103a and the half mirror plate 104a are connectively placed. The size of the half mirror plate 104a was made larger than the size of the display region of the 3D liquid crystal display device 103a. The 3D liquid crystal display device 103a was attached to the half mirror plate 104a with adhesive tape (not shown). Black tape (not shown) was attached to the back-surface-side surface of the half mirror plate 104a in the region not overlapping the display region of the 3D liquid crystal display device 103a.

The 3D liquid crystal display device 103a used was a parallax barrier naked-eye 3D liquid crystal display device (trade name: RockVision 3D, screen size: 151 mm×90 mm) available from I-O Data Device, Inc. The transmission axis of the viewer-side absorptive polarizer (not shown) was at an azimuth angle of 45°, provided that the degree of azimuth angle is defined to be positive (+) in the counterclockwise direction starting from the long side of the 3D liquid crystal display device 103a. The azimuth angles of the axes are described on the basis of the above definition hereinbelow.

The half mirror plate 104a includes, in the order from the back surface side to the viewer side, a half mirror layer 105 and a glass substrate 106 as a base material. The respective members were bonded to each other with an acrylic adhesive (not shown) in between.

The half mirror layer 105 used was a multilayer reflective polarizer (trade name: DBEF) available from Sumitomo 3M Ltd. The reflective polarizer was placed such that the transmission axis was at an azimuth angle of 45°. The glass substrate 106 had a thickness of 2.5 mm.

The mirror display system of Comparative Example 1, in which the 3D liquid crystal display device 103a provides 2D images (parallax: 0 mm), fails to bring the mirror image and video image close to positions with the same depth. Accordingly, the system fails to suppress uncomfortable feeling, failing in simultaneous perception of the mirror image and video image.

Comparative Example 2

Comparative Example 2 is a case where the 3D liquid crystal display device is replaced by a 2D liquid crystal display device that displays 2D video images and includes no control unit. Since the mirror display system of Comparative Example 2 is the same as the mirror display system of Comparative Example 1 except for the above configuration, the description of the same respects is omitted here.

Figure 11:
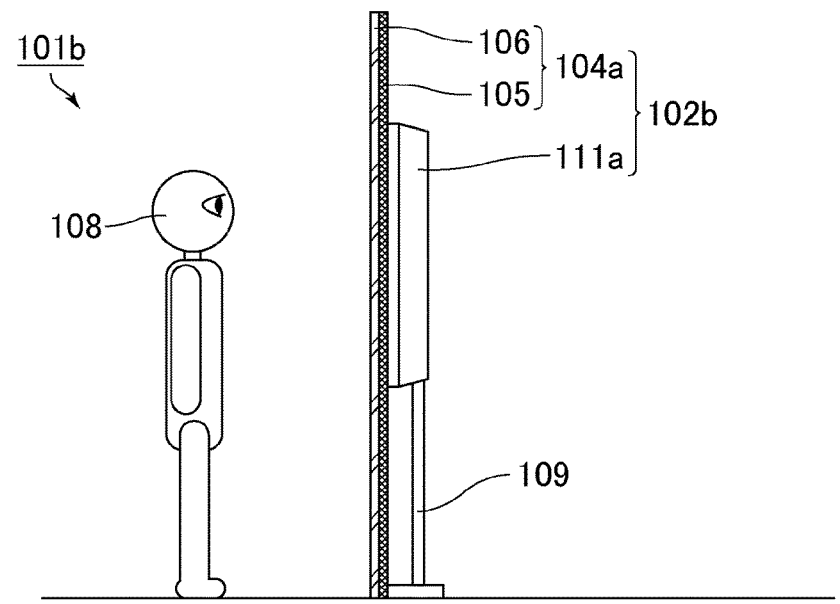
FIG. 11 is a schematic cross-sectional view illustrating a mirror display system of Comparative Example 2.
Figure 12:
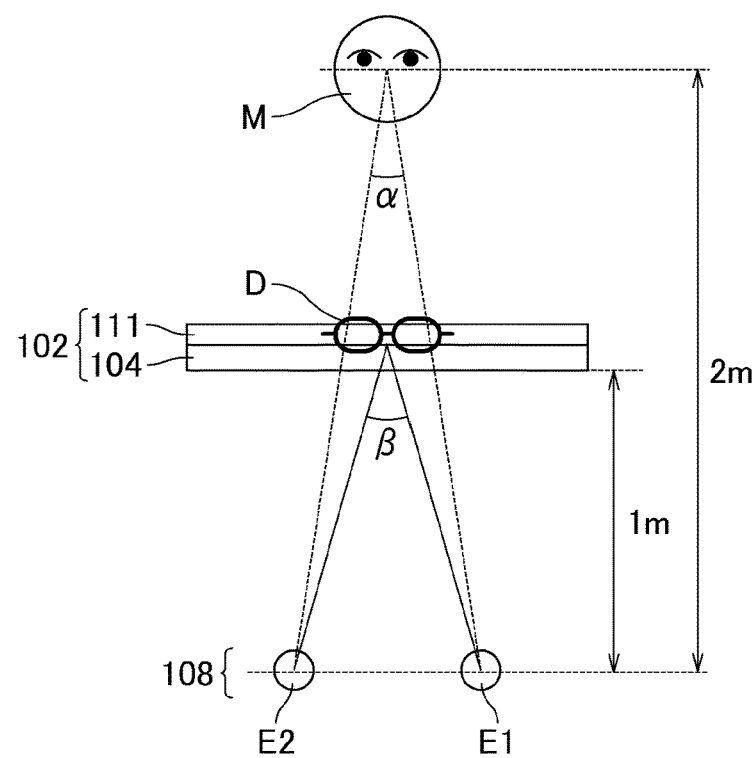
FIG. 12 is a schematic view showing a relation between a mirror image and a video image in a conventional mirror display.

FIG. 11 is a schematic cross-sectional view illustrating a mirror display system of Comparative Example 2. As shown in FIG. 11, a mirror display system 101b includes a mirror display 102b. The mirror display 102b includes, in the order from the back surface side to the viewer side, a 2D liquid crystal display device 111a and the half mirror plate 104a. The 2D liquid crystal display device 111a is placed on the stand 109. The 2D liquid crystal display device 111a and the half mirror plate 104a are connectively placed. The size of the half mirror plate 104a was made larger than the size of the display region of the 2D liquid crystal display device 111a. The 2D liquid crystal display device 111a was attached to the half mirror plate 104a with adhesive tape (not shown). Black tape (not shown) was attached to the back-surface-side surface of the half mirror plate 104a in the region not overlapping the display region of the 2D liquid crystal display device 111a.

The 2D liquid crystal display device 111a used was a liquid crystal television (trade name: LC-20F5, screen size: 486 mm×295 mm) available from Sharp Corporation. The transmission axis of the viewer-side absorptive polarizer (not shown) was at an azimuth angle of 90°, provided that the degree of azimuth angle is defined to be positive (+) in the counterclockwise direction starting from the long side of the 2D liquid crystal display device 111a. The azimuth angles of the axes are described on the basis of the above definition hereinbelow.

The half mirror layer 105 used was a multilayer reflective polarizer (trade name: DBEF) available from Sumitomo 3M Ltd. The reflective polarizer was placed such that the transmission axis was at an azimuth angle of 90°.

The mirror display system of Comparative Example 2, which uses the 2D liquid crystal display device 111*a*, fails to bring the mirror image and video image close to positions with the same depth. Accordingly, the system fails to suppress uncomfortable feeling, failing in simultaneous perception of the mirror image and video image.

Comparative Example 3

Comparative Example 3 is a case where the half mirror plate is eliminated, resulting in the 3D liquid crystal display device (3D liquid crystal display device 103*a*) in Comparative Example 1.

In Comparative Example 3, which uses the 3D liquid crystal display device 103*a* only, video images with a large parallax tend to fail in achieving 3D viewing as already mentioned above.

[Evaluation Results]

The appearances of the mirror images and video images of the mirror display systems of Examples 1 to 14 and Comparative Examples 1 to 3 were evaluated.

The appearances of the mirror image and video image were evaluated by the following method on the assumption that virtual fitting of glasses and clothes was performed.

(1) A video image for evaluation of a pair of glasses drawn on a black background and a video image for evaluation of a tie (a video image of a bow tie was used in the case of a 3D liquid crystal display device with a small screen size) drawn on a black background were displayed on each of the 3D liquid crystal display devices of the examples and comparative examples. Here, since each video image for evaluation has a black background, the background region, namely, the region where the video images of the glasses and tie are not displayed, functions as a mirror. Meanwhile, the region where the video image of the glasses or tie is displayed functions as a display.

(2) Viewers (12 nonspecialists having a corrected visual acuity of not lower than 0.8 for each eye) evaluated if his/her own face (mirror image) matched the glasses and tie (video images) without uncomfortable feeling. The pupillary distances of the viewers were in the range of 60 to 70 mm and the average value thereof was 66 mm. The visual distance was 600 mm.

All the configurations of Examples 1 to 14 were evaluated to have a better appearance of the mirror image (face of the viewer) and the video images (glasses and tie) than the configurations of Comparative Examples 1 to 3. Also, the configurations of the examples were evaluated that the mirror image and the video images were perceived at positions with the same depth and were simultaneously perceptible without uncomfortable feeling. In other words, the viewers felt as if he/she actually tried on the glasses and tie and checked them in a full-length mirror. Accordingly, only displaying video images of glasses and ties with different colors or shapes could provide the viewers with the images in which he/she tried on the glasses and ties with different colors or shapes. Thus, the virtual fitting experience was achieved with improved practicability. In particular, in the configurations of Examples 1 to 11, as the distance between the display surface of the half mirror plate and the pupils of the viewer (visual distance) increases, the video images was more apart from the viewer, along with the mirror image. In contrast, as the visual distance decreases, the video images came closer to the viewer, along with the mirror image. Also, in the configurations of Examples 1 to 11, the quality of each virtual fitting system was the same regardless of the visual distance.

On the other hand, in the configurations of Comparative Examples 1 and 2, the video images (glasses and tie) were perceived in front (on the viewer side) of the mirror image (viewer's face), and thus the viewer failed to simultaneously perceive the mirror image and video image without uncomfortable feeling. In other words, the viewer did not feel as if he/she actually tried on the glasses and tie. In particular, as the distance between the display surface of the half mirror plate and the pupils of the viewer (visual distance) increased, the mirror image was more apart from the viewer while the video image remains on the display surface of the liquid crystal display device. Thereby, uncomfortable feeling between the mirror image and video image increased.

In the configuration of Comparative Example 3, although images for a 3D video image were displayed with the same parallax as in Example 1, a video image for the left eye and a video image for the right eye failed to fuse together (remained as double vision), failing in 3D viewing. The reason for this is as follows. In a 3D liquid crystal display device utilizing a parallax, the lenses of the eyeballs are focused on the display surface of the 3D liquid crystal display device while the displayed 3D video image is perceived at a position different from the display surface of the 3D liquid crystal display device. As a result, a phenomenon is caused in which a conflict occurs between lens accommodation and convergence. Accordingly, the configuration of Comparative Example 3 (3D liquid crystal display device) largely dissociates lens accommodation from convergence, i.e., the video images with a large parallax tend to fail in achieving 3D viewing.

Meanwhile, in the configurations of the respective examples, in which a 3D liquid crystal display device and a half mirror plate are used to constitute a mirror display, when the viewer gazes the mirror image, the focal point is automatically adjusted to the same plane (position) as the plane (position) on which the video image is perceived, and the convergence angle follows the focal point. Accordingly, when the viewer perceives a pair of video images (a video image for the left eye and a video image for the right eye) with a parallax by slightly moving the direction of the eyes or by perceiving the video images in the same field of view, the video images tend to be fused even in the case of having a large parallax. In this case, no conflict occurs between lens accommodation and convergence. However, since the lenses are focused on a position different from the display surface of the 3D liquid crystal display device, the resulting 3D display video image should slightly cause double vision as a fact. Fortunately, when a video image for evaluation different from the video images of glasses and tie was displayed on the 3D liquid crystal display devices of the respective examples, no problem for a practical use as a mirror display system was found.

[Additional Remarks]

The following are the examples of preferred modes of the mirror display system of the present invention. The respective examples may be appropriately employed in combination within the spirit of the present invention.

The display surface of the 3D display device refers to the surface of the member disposed nearest to the viewer among the members that contribute to display, namely, the members that change the optical state (e.g. polarization state). For example, it refers to the viewer-side surface of the polarizer.

The display surface of the half mirror plate refers to the surface of the member with a high (the highest) reflectance, i.e., the viewer-side surface of the half mirror layer (e.g. reflective polarizer). In some cases, the display surface of the 3D display device and the display surface of the half mirror plate respectively correspond to the viewer-side outermost surface of the 3D display device and the viewer-side outermost surface of the half mirror plate. Meanwhile, if a member (e.g. transparent protective plate) that does not contribute to display is disposed on the outermost surface of each of the above members, such a member as the protective plate is not taken as the display surface.

The parallax may be not shorter than 25 mm. This enables the mirror image and video image to be brought sufficiently close to positions with the same depth using the effect of displaying a pair of video images (a video image for the left eye and a video image for the right eye) with a parallax larger than that in conventional displays, and thereby can sufficiently suppress uncomfortable feeling between the mirror image and the video image.

The control unit may be configured to adjust the parallax. This enables a parallax liked by the viewer enhanced practicality.

The control unit may be configured to set the parallax that satisfies the formula (1):

[Math. 2]

$$X = \frac{X0}{2}\left(1 - \frac{L1}{L0}\right) \quad (1)$$

where X represents the parallax, X0 represents a pupillary distance of a viewer, L0 represents the distance between the display surface of the half mirror plate and the pupils of the viewer, and L1 represents the distance between the 3D display device and the half mirror plate, with L1<L0.

This enables an optimum video image to be displayed on the 3D display device, resulting in perception of the mirror image and video image at positions with the same depth. If the 3D display device and half mirror plate are connectively placed (L1=0), the optimum parallax is half of the pupillary distance X0. If the 3D display device and half mirror plate are placed apart, the optimum parallax can be reduced compared to the case where the 3D display device and half mirror plate are connectively placed. As a result, the video images can be more surely fused with each other.

The mirror display may further include a length measurement device for measuring the pupillary distance of the viewer, and the control unit may be configured to set the parallax in conjunction with the length measurement device. This enables setting of an optimum parallax corresponding to the pupillary distance of the viewer, resulting in a mirror display system with usability.

The control unit may be configured to record the parallax of each viewer. This enables avoidance of setting the parallax by the viewer every time he/she uses the mirror display system, achieving a mirror display system with usability.

The half mirror layer may include a reflective polarizer. This enables suitable use of the present invention even when a reflective polarizer is used as a half mirror layer. Furthermore, combination use with a liquid crystal display device (3D liquid crystal display device) can achieve both of the visibility of the mirror image and the visibility of the video image. Additionally, an arrangement in which multiple reflective polarizers as half mirror layers are disposed such that the respective transmission axes cross enables sufficiently enhanced reflectance of the mirror.

The 3D display device may be a liquid crystal display device. This enables suitable use of the present invention even when a liquid crystal display device (3D liquid crystal display device) is used as a 3D display device. Furthermore, combination use with a reflective polarizer can achieve both of the visibility of the mirror image and the visibility of the video image.

The 3D display device may be configured to adjust at least one of (A) the positions of the video image for the left eye and the video image for the right eye, (B) the state of a barrier, and (C) the state of lenses, in accordance with the movement of the viewer. This enables the 3D display device to have a feature called an eye tracking feature, to increase the viewing angle as 3D display, and to achieve a mirror display system with a high practicality.

REFERENCE SIGNS LIST 1a, 1b, 101a, 101b: mirror display system
2, 102, 102a, 102b: mirror display
3, 103a: 3D liquid crystal display device
4, 104, 104a: half mirror plate
5, 105: half mirror layer
6, 106: glass substrate
7: control unit
8, 108: viewer
9, 109: stand
10: wire
111, 111a: 2D liquid crystal display device
M: mirror image
D: video image
E1, E2: pupil (eye)
α, β: convergence angle

The invention claimed is:
1. A mirror display system comprising:
a half mirror plate including a half mirror layer;
a 3D display device that displays three-dimensional video images; and
a control unit configured to supply a video signal to the 3D display device, wherein
the 3D display device is disposed on a back surface side of the half mirror plate and is configured to display, by the video signal, a video image for a left eye and a video image for a right eye that give a parallax on a display surface of the 3D display device,
the parallax is set such that a fused video image of the video image for the left eye and the video image for the right eye is perceived on the back surface side behind the display surface of the 3D display device,
the display surface of the 3D display device is parallel to a display surface of the half mirror plate, and
the control unit is configured to set the parallax that satisfies the following formula:

$$X = \frac{X0}{2}\left(1 - \frac{L1}{L0}\right) \quad (1)$$

where X represents the parallax, X0 represents a pupillary distance of a viewer, L0 represents a distance between the display surface of the half mirror plate and pupils of the viewer, and L1 represents a distance between the 3D display device and the half mirror plate, with L1<L0.

2. The mirror display system according to claim 1, wherein the parallax is not shorter than 25 mm.

3. The mirror display system according to claim 1, wherein the control unit is configured to adjust the parallax.

4. The mirror display system according to claim 1, further comprising a length measurement device for measuring the pupillary distance of the viewer,
wherein the control unit is configured to set the parallax in conjunction with the length measurement device.

5. The mirror display system according to claim 1, wherein the control unit is configured to record the parallax of each viewer.

6. The mirror display system according to claim 1, wherein the half mirror layer includes a reflective polarizer.

7. The mirror display system according to claim 1, wherein the 3D display device is a liquid crystal display device.

8. The mirror display system according to claim 1, wherein the 3D display device is configured to adjust at least one of (A) positions of the video image for the left eye and the video image for the right eye, (B) a state of a barrier, and (C) a state of lenses, in accordance with movement of the viewer.

9. The mirror display system according to claim 1, wherein the 3D display device and the half mirror plate are connected to one another.

* * * * *